(12) United States Patent
Beaulieu

(10) Patent No.: US 7,559,604 B2
(45) Date of Patent: Jul. 14, 2009

(54) DEVICE FOR SECURING A SADDLE ON THE HEAD OF A SADDLE POST

(75) Inventor: Cyril Beaulieu, Coulanges les Nevers (FR)

(73) Assignee: Look Cycle International, Nevers (FR)

( * ) Notice: Subject to any disclaimer, the term of this patent is extended or adjusted under 35 U.S.C. 154(b) by 505 days.

(21) Appl. No.: 11/430,872

(22) Filed: May 10, 2006

(65) Prior Publication Data
US 2006/0290096 A1 Dec. 28, 2006

(30) Foreign Application Priority Data
May 11, 2005 (FR) .................................. 05 04727

(51) Int. Cl.
*B62J 1/00* (2006.01)
(52) U.S. Cl. .............................. 297/215.15; 297/215.14
(58) Field of Classification Search ............ 297/215.14, 297/215.13, 215.15, 195.1; 403/82, 83, 84, 403/87
See application file for complete search history.

(56) References Cited

U.S. PATENT DOCUMENTS

| | | | | |
|---|---|---|---|---|
| 3,992,054 | A | 11/1976 | Campagnolo | |
| 4,275,922 | A * | 6/1981 | Juy | 297/215.14 |
| 4,421,357 | A | 12/1983 | Shimano | |
| 4,440,440 | A * | 4/1984 | Juy | 297/215.14 |
| 4,502,811 | A | 3/1985 | Patriarca | |
| 4,568,121 | A | 2/1986 | Kashima | |
| 4,983,063 | A * | 1/1991 | Phillips | 403/4 |
| 5,988,741 | A * | 11/1999 | Voss et al. | 297/215.15 |

FOREIGN PATENT DOCUMENTS

| | | |
|---|---|---|
| FR | 2 535 279 | 5/1984 |
| GB | 1 529 072 | 10/1978 |

* cited by examiner

*Primary Examiner*—Milton Nelson, Jr.
(74) *Attorney, Agent, or Firm*—Young & Thompson

(57) ABSTRACT

The device includes a lower gripping member (5) and an upper gripping member (6). The lower gripping member has an incurved surface bearing against the incurved surface provided on a slider (15). The slider can be moved in the longitudinal direction along a slide way (16) provided on the saddle post head (4). The upper gripping member (6) is connected to the saddle post head by a gripping screw (17) passing through a hole (18; 19; 20) provided respectively in the saddle post head, the slide way (15), and the lower gripping member (5). The hole (18) in the saddle post head (4) is a first longitudinal slot permitting the continuous adjustment of the longitudinal position of the slider, and the hole (19) in the slider is a second slot aligned with the first slot (18) and permitting the inclination of the gripping screw.

11 Claims, 2 Drawing Sheets

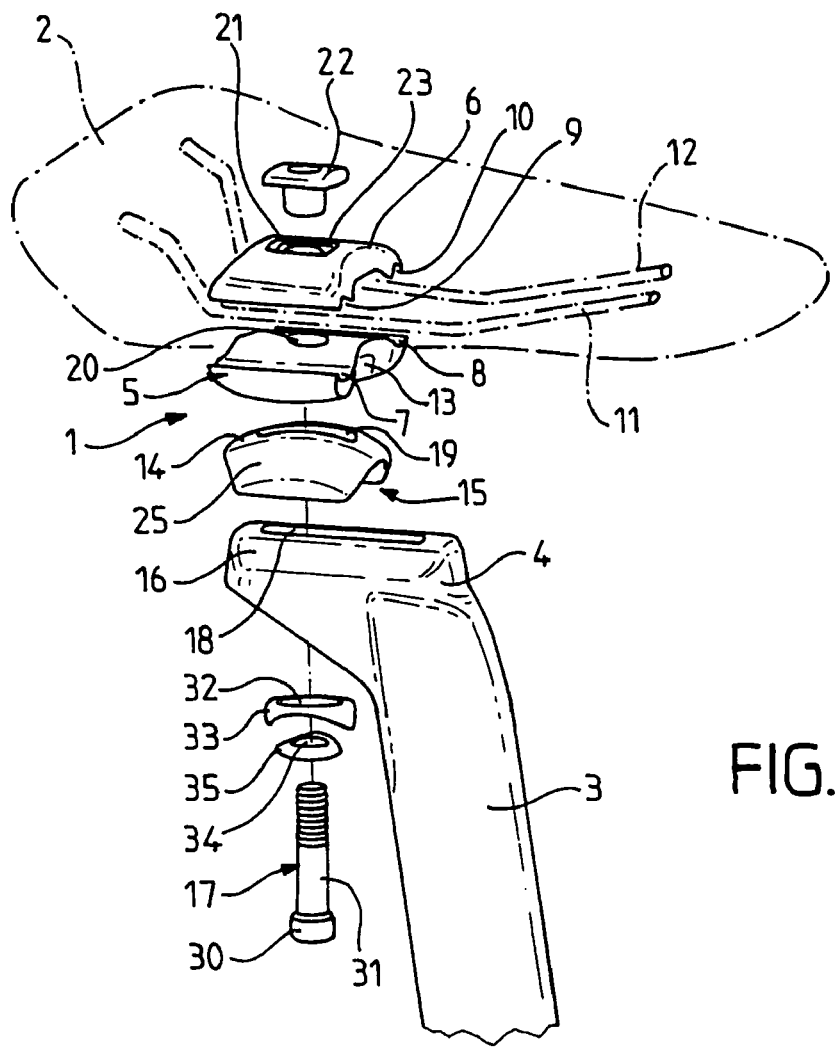
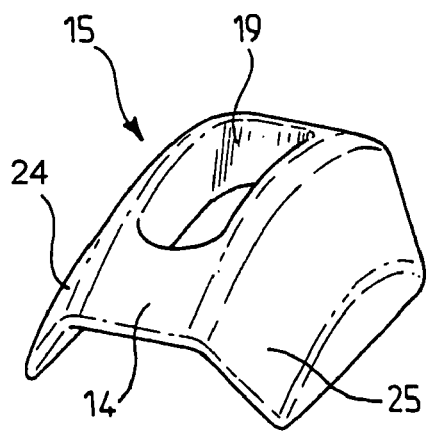
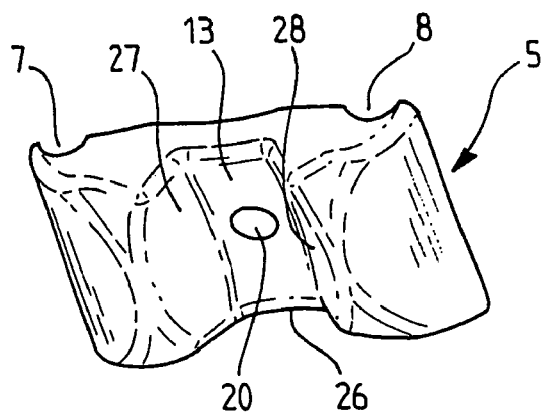
FIG.1
FIG.2
FIG.3

DEVICE FOR SECURING A SADDLE ON THE HEAD OF A SADDLE POST

The present invention relates to a device for securing a saddle on a saddle post, and particularly on a head of a saddle post having at its upper end an elbowed shape.

BACKGROUND OF THE INVENTION

One type of conventional securement device comprises, in its simplest form, a first plate constituting a lower gripping member fixed directly on the post head, and a second plate constituting an upper gripping member, each gripping member being provided with two parallel grooves disposed facing parallel grooves provided on the opposed gripping member. The facing grooves receive two rails constituted by metallic rods fixed on the lower surface of the saddle.

The upper gripping member is connected to the head of the saddle post by a gripping screw which passes through a bore provided in the saddle post head and through a bore provided in the lower gripping member. This gripping screw screws either into a tapped bore provided on the lower surface of the upper gripping member, or else into a nut on the upper surface of the upper gripping member, and in this latter case, it passes through a bore in the latter to coact with the nut.

However, even if this securement device permits a certain adjustment of the position of the saddle of about 20 mm in the longitudinal direction by movement of the device along rail sections which are parallel to each other, it does not permit an inclination of the saddle because the lower gripping member is fixed permanently on the post head and cannot be inclined.

So as to be able to regulate the inclination of the saddle, one solution consists in providing on the saddle post head an incurved surface, which is to say convex or concave, which contacts with the surface of complementary shape on the lower surface of the lower gripping member which is in this case constituted by a separate and detachable piece.

In another simplified securement device, the lower and upper gripping members are in the form of two halves of a tube cut along its length and comprising at its ends impressions corresponding to the shape of the saddle securement rails. These two half tubes are disposed facing each other and trapped by a circular slotted gripping collar and a gripping screw gripping the collar.

It is to be noted that all these securement devices determine a fixed longitudinal position for the gripping members, which limits the longitudinal adjustment of the saddle to the rectilinear and parallel paths of the portions of the saddle rails which can slide between the gripping members when these latter are ungripped.

Finally, there is another conventional saddle securement device permitting covering a wider range of adjustment as to length. This device comprises a slider movable in the longitudinal direction along a prismatic slide way formed on the head of the saddle post.

This slider has an upper concave surface coacting with a complementary surface on the lower surface of a plate with two parallel grooves constituting a lower gripping member.

The post head comprises on its lower surface a recess which serves to receive the head of a gripping screw which extends through one of three spaced bores opening on the upper surface of the slider to pass through, in this order, a bore provided in the slider, a slot provided in the lower gripping member, and a slot provided in a plate constituting a second gripping member with two parallel grooves so as finally to coact with a nut.

This nut has a lower convex cylindrical surface with a transverse axis received in a cylindrical concave recess of complementary shape which is provided on the upper surface of the upper gripping member. Thus, the gripping screw remains vertical whilst the inclination of the saddle can be adjusted. The adjustment of the position of the saddle takes place on the one hand as usual by letting the rails below the saddle slide in grooves of the lower and upper gripping members, and on the other hand by inserting the screw into one or the other of the three bores in the post head which represent a retracted position, a medial position and an advanced position.

One of the drawbacks of this device is that it is difficult during assembly to hold the nut such that its bore will be disposed vertically to receive the end of the gripping screw. In practice, in order to emplace the gripping screw, it is necessary to turn the gripping member more than 90° relative to its use position and then to return it by 90° such that the grooves of the upper and lower gripping members will be parallel to each other. This assembly is rendered still more difficult when the screw is located in the advance position near the saddle post.

Generally speaking, the assembly of all the known devices is more or less difficult when the saddle is in place, because on the one hand the access is then prevented from above and the available space below is very restricted because of the presence of the rails and of the post.

In the case in which moreover the screw is inclined forwardly, the approach of the gripping key to it is rendered more difficult because of the risk of interference with the saddle post. Avoiding this risk requires carrying out a very great and advanced excavation on the lower surface of the post head, which lowers the strength, increases the lateral size and as the case may be renders molding of the post more complex.

SUMMARY OF THE INVENTION

The object of the invention is to overcome these drawbacks by providing a device for the securement of a saddle which is easy to assemble, light in weight, compact in height and that has a large range of longitudinal adjustment.

The object of the invention is a device for securing a saddle on a saddle post head, comprising a lower gripping member and an upper gripping member, parallel grooves being provided in said lower gripping member and disposed facing parallel grooves provided in said upper gripping member, said facing grooves being adapted to receive longitudinal rails fixed on the lower surface of the saddle, said lower gripping member having an incurved surface that bears against a complementary incurved surface provided on the slider so as to permit the adjustment of the inclination of the saddle, said slider being adapted to be moved in the longitudinal direction along a slide way provided on the saddle post head, said upper gripping member being connected to the saddle post head by a gripping screw passing through a hole provided in the saddle post head, a passage hole provided in said slider, and a passage hole provided in said lower gripping member, characterized by the fact that the passage hole in the saddle post head is a first longitudinal slot permitting the continuous adjustment of the longitudinal position of said slider, and that the passage hole in said slider is a second slot aligned with said first slot and permitting the inclination of said gripping screw in a longitudinal plane.

According to other characteristics of the invention:
said slider has lateral flanks in the form of conical sectors coacting with a central of complementary shape on the lower surface of said lower gripping member;

said first slot communicates with a groove on the lower surface of the saddle post head whose bottom is flat and parallel to said slide way, said bottom constituting a bearing surface for the head of said gripping screw, and the shank of the gripping screw passes through a longitudinal slot of a crosspiece guided in said groove and whose upper surface is flat to slide against said bottom;

said crosspiece if a first crosspiece whose lower surface is spherical concave, and the shank of the gripping screw passes through a circular hole in a second crosspiece having an upper spherical convex surface complementary to said spherical concave surface of said first crosspiece, and a lower flat surface coacting with the head of said gripping screw;

the incurved surface of said lower gripping member and of said slider, as well as the spherical surface of said first and second crosspieces, are centered about a same transverse horizontal axis, located below said head of the gripping screw;

the respective front and rear end surfaces of said first slot of the saddle post head, of said second slot of said slider, and of the slot of said first crosspiece, are aligned with each other when said slider is located in end positions;

said end surfaces are inclined so as to delimit the inclination of said gripping screw in said end positions of the latter.

BRIEF DESCRIPTION OF THE DRAWINGS

Other characteristics and advantages of the invention will become apparent from the description which follows, of a non-limiting example of the invention, with reference to the accompanying drawings, in which:

FIG. 1 is an exploded perspective view of a securement device according to the invention for the securement of a saddle on a saddle head;

FIG. 2 is a perspective view of a slider;

FIG. 3 is a perspective view of a lower gripping member;

DETAILED DESCRIPTION

Figure 4:
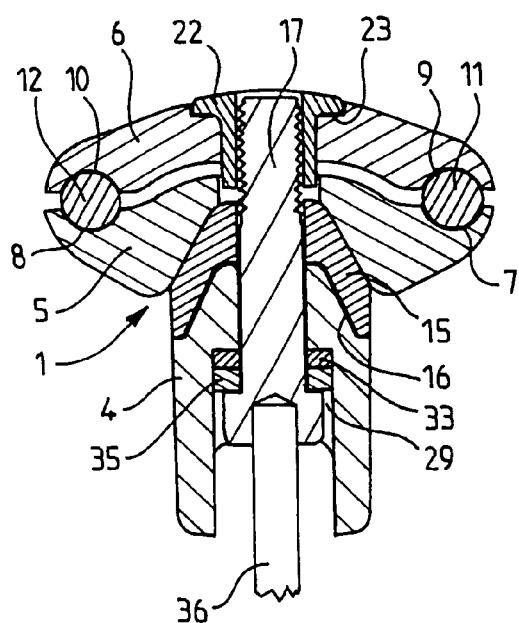
FIG. 4 is a transverse cross-sectional view of a securement device according to the invention mounted on a saddle post head.

In the drawings, identical or equivalent elements bear the same reference numerals.

FIG. 1 shows in an assembly view all the constituent elements of a securement device 1 according to the invention, adapted to secure a saddle 2 (shown schematically in broken lines) on a saddle post 3 and more particularly on an elbowed saddle post head 4.

In a manner known per se, the securement device 1 comprises a lower gripping member 5 and an upper gripping member 6. The lower gripping member 5 is formed by a plate comprising on its upper surface two parallel grooves 7, 8 disposed facing two parallel grooves 9, 10 provided on the lower surface of the upper gripping member 6, also formed as a plate.

The facing grooves 7, 9 respective 8, 10 of the lower and upper gripping members 5, 6 are adapted to receive between them longitudinal rails 11, 12 secured to the lower surface of the saddle 2. These rails 11, 12, which are shown very schematically in FIG. 1, are thus adapted to be gripped between the lower and upper gripping members 5, 6 so as to retain the saddle on the saddle post head 4 whilst permitting a certain adjustment of the position of the saddle in the longitudinal direction of the order of 20 mm when the rails 11, 12 are ungripped.

The lower gripping member 5 has on its lower surface an incurved concave surface 13 that bears against a convex incurved surface 14 of a slider 15, these incurved surfaces thus permitting adjustment of the inclination of the saddle.

The slider 15 can be moved in the longitudinal direction along a prismatic slideway 16 provided on the saddle post head 4. The slider thus permits supplemental adjustment of the position of the saddle in the longitudinal direction.

The upper gripping member 5 is connected to the saddle post head 4 by a gripping screw 17 passing through a hole 18 provided in the saddle post head 4, a passage hole 19 in the slider 15, and a passage hole 20 in the lower gripping member 5. In the illustrated example, the upper gripping member 6 is of a composite material and the screwthreaded end of the gripping screw 17 moreover passes through a passage hole 21 in this upper gripping member to be screwed into the tapping of an insert 22 received in a recess 23 provided on the upper surface of this member 6. In the case in which the upper gripping member 6 is of metal, a tapped hole can be provided directly on the lower surface of the upper gripping member.

According to an important characteristic of the invention, the passage hole 18 in the saddle post head 4 is a first longitudinal slot permitting the continuous adjustment of the longitudinal position of the slider 15, whilst the passage hole 19 in this latter is a second slot aligned with the first slot and permitting the inclination of the gripping screw 17 in a horizontal plane.

According to a preferred characteristic of the invention, the slider 15 has lateral flanks 24, 25 in the form of conical sectors coacting with a central recess 26 on the lower surface of the lower gripping member 5, this recess having lateral sides 27, 28 of complementary shape. These surfaces in the form of conical sectors permit pivoting the saddle 2 in a substantially horizontal plane.

Figure 5:
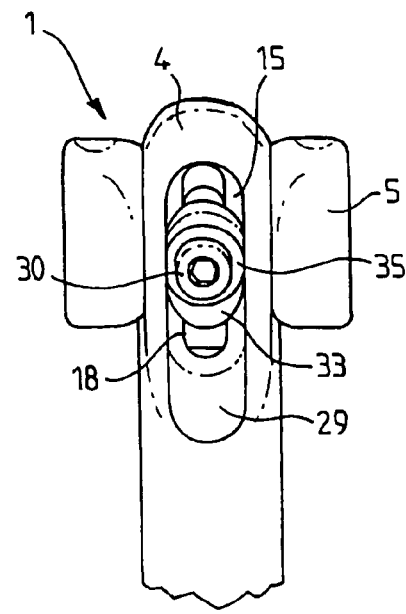
FIG. 5 is a view from below of a saddle head provided with the device of FIG. 4.

The first slot 18 in the saddle post head 4 moreover communicates with a groove 29 (see FIGS. 4 and 5) in the lower surface of this latter. The bottom of this groove 29 is flat and constitutes a bearing surface for the head 30 of the gripping screw 17. According to another characteristic of the invention, the head 30 of the gripping screw 17 passes through a longitudinal slot 32 in a crosspiece 33 guided in the groove 29 and whose upper surface is flat to slide against the bottom of the groove.

The crosspiece 33 is a first crosspiece whose lower surface is spherical concave and the shank of screw 31 moreover passes through a cylindrical hole 34 of a second crosspiece 35 having an upper spherical convex surface complementary to the spherical concave surface of the first crosspiece 33, and the lower flat surface coacting with the head 30 of the gripping screw 17.

Figure 6:
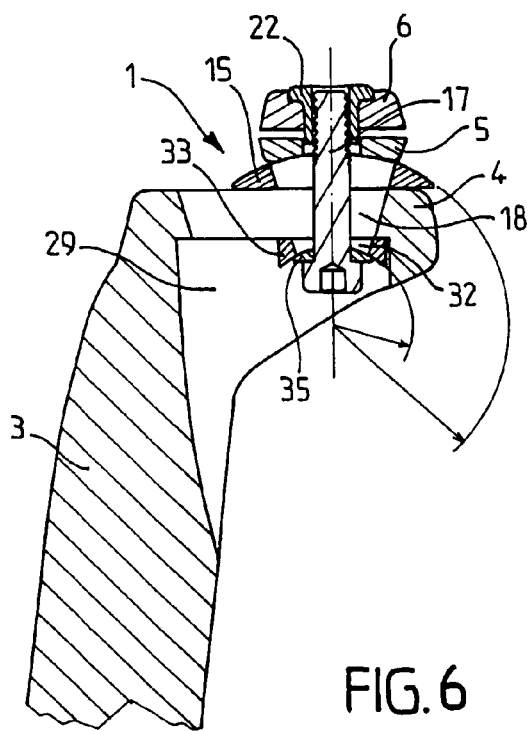
FIG. 6 is a longitudinal cross-sectional view of the securement device according to the invention mounted on a head of a saddle post, the device being located in a retracted end position.

Preferably, the lower incurved surface of the lower gripping member 5, the upper incurved surface of the slider, as well as the spherical surface of the first and second crosspieces 33, 35, are centered about a same transverse horizontal axis, located below the head 30 of the gripping screw 17 (see FIG. 6).

Moreover, the respective front and rear end surfaces of the first slot 18 of the saddle post head 4, of the second slot 19 of the slider 15, and of the slot 32 of the first crosspiece 33, are aligned with each other when the slider 15 is located in its end positions. These end surfaces are moreover preferably inclined so as to delimit the inclination of the gripping screw 17 in the end positions of this latter.

Figure 7:
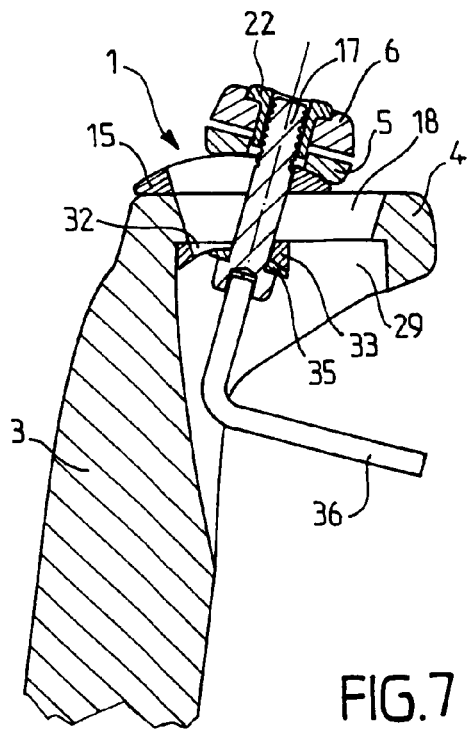
FIG. 7 is a longitudinal cross-sectional view of the securement device according to the invention mounted on a saddle post head, the device being located in an advanced end position.

Thanks to the configuration provided by the invention, the screw head 30 remains practically in the same longitudinal position no matter what its inclination and this prevents it from being located in too advanced a position, which would be undesirable for the introduction of the gripping key 36. FIG. 7 shows that even in this advanced end position, the screw head 30 remains accessible without any difficulty. It moreover can be seen in FIGS. 6 and 7 that the screw head 30 practically does not change its longitudinal position when the inclination of the saddle is modified.

Moreover, when the gripping screw 17 is gripped in inclined position, which is practically always the case because the saddle rails 11, 12 are almost never horizontal, the different elements remain aligned on the same axis and will be blocked in this inclined position and this according to the phenomenon described below.

In the case in which the gripping screw 17 is inclined relative to the normal to rails 11, 12, the force of moving the screw during its screwing has the tendency to return the elements according to this norm corresponding substantially to the vertical, because of the transverse forces generated by the inclination of the line of action of the gripping screw relative to the bearing surfaces of the elements to be gripped, which is to say the bearing surfaces of the slider 15 on the slide way 16 on the one part, and the bearing surface of the first crosspiece 33 in the bottom of the groove 29 on the other hand. But at the same time, the incurved or spherical bearing surfaces of the different elements, from top to bottom: the lower gripping member 5, the slider 15 and the first and second crosspieces 33, 35, have the tendency, because they are centered on the same transverse axis, to maintain all the assembly aligned in its initial position.

These antagonistic forces neutralize each other by introducing transversely of the screw shaft two opposite flexures similar to a shear stress and applied to the two planes of sliding.

The new geometry defined by the invention permits reducing the size and height of the device, which is all the more important because the space available is relatively reduced.

Thus, a saddle post head provided with the securement device according to the invention, whose elements are easy to produce, has very advantageous characteristics as to ease of use, light weight, height and large range of longitudinal adjustment.

The invention claimed is:

1. A securement device for a saddle (1) on a saddle post head (4), comprising:
a lower gripping member (5) and an upper gripping member (6);
first parallel grooves (7, 8) being provided in said lower gripping member (5) and disposed facing second parallel grooves (9, 10) provided in said upper gripping member (6), wherein said first parallel grooves (7, 8) and second parallel groves (9, 10) face each other such that the first and second parallel grooves (7, 9; 8, 10) are adapted to receive longitudinal rails (11, 12) fixed on the lower surface of the saddle (1),
said lower gripping member (5) having an incurved surface that bears against a complementary incurved surface provided on a slider (15) so as to permit adjustment of an inclination of the saddle, said slider (15) being adapted to move in a longitudinal direction along a slide way (16) provided on the saddle post head (4),
said upper gripping member (6) being connected to the saddle post head by a gripping screw (17) passing through a first hole (18) provided in the saddle post head (4);
a second hole (19) provided in said slider (15), and
a third hole (20) provided in the said lower gripping member (5), wherein the first hole (18) in the saddle post head (4) is a first longitudinal slot permitting continuous adjustment of the longitudinal position of said slider (15), and that the second hole (19) in said slider is a second slot aligned with said first hole (18) and permitting an inclination of said gripping screw (17) in a longitudinal plane.

2. The securement device according to claim 1, wherein said slider (15) has lateral flanks (24, 25) in the form of conical sectors contacting with a central recess (26) of complementary shape on the lower surface of said lower gripping member (5).

3. The securement device according to claim 2, in which said first hole (18) communicates with a groove (29) on the lower surface of the saddle post head (4) whose bottom is flat and parallel to said slide way (16), said bottom constituting a bearing surface for a head (30) of said gripping screw (17), wherein a shank (31) of the gripping screw (17) passes through a longitudinal slot (32) of a crosspiece (33) guided in said groove (29) and whose upper surface is flat to slide against said bottom.

4. The securement device according to claim 1, in which said first hole (18) communicates with a groove (29) on the lower surface of the saddle post head (4) whose bottom is flat and parallel to said slide way (16), said bottom constituting a bearing surface for a head (30) of said gripping screw (17), wherein a shank (31) of the gripping screw (17) passes through a longitudinal slot (32) of a crosspiece (33) guided in said groove (29) and whose upper surface is flat to slide against said bottom.

5. The securement device according to claim 4, wherein the respective front and rear end surfaces of said first hole (18) of the saddle post head (4), of said second hole (19) of said slider (15) and of the slot (32) of said first crosspiece (33) are aligned with each other when said slider (15) is located in end positions.

6. The securement device according to claim 5, wherein said front end surfaces and said rear end surfaces are inclined so as to delimit the inclination of said gripping screw (17) in the end positions.

7. The securement device according to claim 4, wherein said crosspiece (33) is a first crosspiece whose lower surface is spherical concave, and that the shank (31) of the gripping screw (17) passes through a circular hole (34) of a second crosspiece (35) having a spherical convex upper surface complementary to said spherical concave surface of said first crosspiece (33), and a lower flat surface contacting with the head (30) of said gripping screw (17).

8. The securement device according to claim 7, wherein the respective front and rear end surfaces of said first hole (18) of the saddle post head (4), of said second hole (19) of said slider (15) and of the slot (32) of said first crosspiece (33) are aligned with each other when said slider (15) is located in end positions.

9. The securement device according to claim 7, wherein the incurved surface of said lower gripping member (5) and of said slider (15), as well as the spherical concave surface of said first crosspiece and the spherical convex surface of said second crosspiece (33, 35), are centered about a same horizontal transverse axis, located below said gripping screw head (30).

10. The securement device according to claim 9, wherein the respective front and rear end surfaces of said first hole (18) of the saddle post head (4), of said second hole (19) of said slider (15) and of the slot (32) of said first crosspiece (33) are aligned with each other when said slider (15) is located in end positions.

11. A securement device for a saddle on a saddle post head comprising:
- an upper gripping member including first parallel grooves formed in a lower surface of said upper gripping member;
- a lower gripping member including second parallel groves formed in an upper surface of said lower gripping member;
- longitudinal rails fixed on a lower surface of the saddle, wherein said rails are adapted to be positioned within said first and second parallel grooves;
- a slider that moves in a longitudinal direction along a slide way formed in the saddle post head, wherein an upper surface of said slider contacts the lower surface of said lower gripping member so as to permit adjustment of an inclination of the saddle;
- a first hole provided in the saddle post head, wherein said first hole is a first longitudinal slot permitting continuous adjustment of longitudinal position of said slider;
- a second hole provided in said slider, wherein said second hole is a second slot aligned with said first hole;
- a third hole provided in said lower gripping member; and
- a gripping screw passing through said first, second and third holes, wherein the second hole is aligned with said first hole to permit an inclination of said gripping screw in a longitudinal plane.

* * * * *